(12) United States Patent
Yano

(10) Patent No.: US 7,159,989 B2
(45) Date of Patent: Jan. 9, 2007

(54) IMAGE DISPLAY DEVICE

(75) Inventor: Tomoya Yano, Kanagawa (JP)

(73) Assignee: Sony Corporation, Tokyo (JP)

( * ) Notice: Subject to any disclaimer, the term of this patent is extended or adjusted under 35 U.S.C. 154(b) by 171 days.

(21) Appl. No.: 10/502,036

(22) PCT Filed: Jan. 23, 2003

(86) PCT No.: PCT/JP03/00607

§ 371 (c)(1),
(2), (4) Date: Jul. 20, 2004

(87) PCT Pub. No.: WO03/062902

PCT Pub. Date: Jul. 31, 2003

(65) Prior Publication Data

US 2005/0105053 A1    May 19, 2005

(30) Foreign Application Priority Data

Jan. 25, 2002   (JP)   ............................. 2002-017622

(51) Int. Cl.
*G03B 21/14* (2006.01)
(52) U.S. Cl. ........................ 353/81; 353/94; 348/771
(58) Field of Classification Search .................. 353/33, 353/81, 20, 94; 349/8, 57; 348/762, 767, 348/771

See application file for complete search history.

(56) References Cited

U.S. PATENT DOCUMENTS 6,454,417 B1 * 9/2002 Takamoto et al. ............ 353/33
6,587,269 B1 * 7/2003 Li .............................. 359/497
6,908,197 B1 * 6/2005 Penn ............................ 353/34
2003/0031017 A1 * 2/2003 Tsuji .......................... 362/268
2003/0095213 A1 * 5/2003 Kanayama et al. .......... 348/742
2003/0151834 A1 * 8/2003 Penn .......................... 359/833

FOREIGN PATENT DOCUMENTS

| JP | 11-258547 | 9/1999 |
| JP | 2000-9996 | 1/2000 |
| JP | 2000-267044 | 9/2000 |
| JP | 2001-51232 | 2/2001 |
| JP | 2002-287085 | 10/2002 |
| JP | 2003-57591 | 2/2003 |
| JP | 2003-57751 | 2/2003 |
| JP | 2003-121792 | 4/2003 |
| JP | 2003-161908 | 6/2003 |
| JP | 2003-161917 | 6/2003 |

* cited by examiner

*Primary Examiner*—W. B. Perkey
*Assistant Examiner*—Andrew Sever
(74) *Attorney, Agent, or Firm*—Robert J. Depke; Rockey, Depke, Lyons & Kitzinger LLC

(57) ABSTRACT

The present invention is directed to an image display apparatus comprising an illumination optical system (2) for illuminating a light valve (1) including a reflection electrode, and a projection lens (3) for forming an image of the light valve (1), wherein reflection plane surface (4) is disposed between the illumination optical system (2) and the light value (1) to bent, by the reflection plane surface (4), an optical path of illumination light extending from the illumination optical system (2) to the light valve (1).

2 Claims, 14 Drawing Sheets

IMAGE DISPLAY DEVICE

TECHNICAL FIELD

The present invention relates to an image display apparatus adapted for projecting, by projection lens, an image of spatial light modulation element onto screen, etc. to perform image display.

This Application claims for priority of Japanese Patent Application No. 2002-017622, filed on Jan. 25, 2002, the entirety of which is incorporated by reference herein.

BACKGROUND ART

Hitherto, there is proposed an image display apparatus including a spatial light modulation element and adapted for projecting, by projection lens, an image of the spatial light modulation element onto screen, etc. to perform image display. As image display apparatuses of this kind, there is an apparatus having a configuration as shown in FIG. 1. The image display apparatus shown in FIG. 1 comprises an illumination optical system 102 including a light source 101 such as discharge lamp, etc., and serves to illuminate, by the illumination optical system 102, a spatial light modulation element 103 using polarization such as liquid crystal, etc. to project, by a projection lens 104, an image of the spatial light modulation element 103 onto screen (not shown). The image display apparatus of the projection type has been put into practical use as large-sized image display apparatus.

As a spatial light modulation element used in the image display apparatus of this kind, there is used a spatial light modulation element of the reflection type including reflection electrode. In such spatial light modulation element of the reflection type, aperture ratio can be enlarged, and miniaturization and high definition (image) can be realized.

The image display apparatus shown in FIG. 1 generally uses polarization beam splitter (PBS) 105 as polarizer and analyzer. Namely, light beams emitted from the illumination optical system 102 are incident on the polarization beam splitter 105 serving as polarizer so that only component in specific polarization direction is selected. The light beams thus obtained are incident on the spatial light modulation element 103.

Between the polarization beam splitter 105 and the spatial light modulation element 103, there is disposed a dichroic prism 106 as color separation/analysis element. Namely, illumination light which has been passed through the polarization beam splitter 105 is color-separated into R (red), G (green) and B (blue) at the dichroic prism 106. The respective color components are incident on corresponding to spatial light modulation elements 103, 103, 103. These incident color components are polarized and modulated. The color components thus obtained are reflected.

Reflected light beams from the respective spatial light modulation elements 103, 103, 103 corresponding to respective color components of R, G, B are color-synthesized at the dichroic prism 106. The light beams thus obtained are incident on the polarization beam splitter 105. Here, the polarization beam splitter 105 acts (functions) as analyzer to allow only specific polarized light component to be passed therethrough to thereby convert polarization modulation at the respective spatial light modulation elements 103, 103, 103 into intensity modulation. As the result of the fact that light beams which have been intensity-modulated in this way are incident on the projection lens 104, images corresponding to modulations at the respective spatial light modulation elements 103, 103, 103 are projected and displayed on the screen.

In the image display apparatus as described above, polarization beam splitter used as polarizer and analyzer serves to select polarized light component by difference between reflection factor of P-polarized light and reflection factor of S-polarized light at face of dielectric multi-layer film, and has great wavelength dependency and great angle dependency of incident light. For this reason, in this image display apparatus, bright illumination optical system having low F number cannot be used. As a result, it is difficult to improve light utilization efficiency.

In the above-described image display apparatus, dichroic prism used as color separation/synthesis element has large polarization dependency. Namely, characteristics at dichroic surfaces of incident light (S-polarized light) and outgoing light (P-polarized light) are different from each other so that polarization axis of modulated light which has been passed through the spatial light modulation element is placed in the direction perpendicular to incident light polarization axis. For this reason, light utilization efficiency is lowered.

Here, there is conceivable an optical system in which the optical axis of the illumination optical system is included (tilted) with respect to the spatial light modulation element to thereby use polarization plate in place of polarization beam splitter. In this optical system, in order that eclipse (shading) of illumination light by mirror cylinder of projection lens does not take place, it is necessary to increase tilt (inclination) with respect to the spatial light modulation element of the optical axis of the illumination optical system. When the optical axis of the illumination optical system is greatly tilted with respect to the spatial light modulation element, the optical axis of light beams incident on the projection lens is also tilted in accordance with this tilt (inclination), the characteristic of the projection lens is deteriorated. Further, incident angle of illumination light onto polarization plate or spatial light modulation element is increased so that illumination efficiency is lowered, and contrast of display image is lowered.

DISCLOSURE OF THE INVENTION

An object of the present invention is to provide a novel image display apparatus which can solve the problems that conventional image display apparatuses as described above have.

Another object of the present invention is to provide an image display apparatus which can use bright illumination optical system having low F number.

A further object of the present invention is to provide an image display apparatus adapted so that lowering of light utilization efficiency at color separation/synthesis element is prevented so that bright image display can be performed.

The image display apparatus according to the present invention comprises a spatial light modulation element including a reflection electrode, an illumination optical system including a polarization element and a light source and adapted for illuminating the spatial light modulation element by the light source through the polarization element, and a polarization lens for forming an image of the spatial light modulation element, wherein reflection plane surface is disposed between the illumination optical system and the spatial light modulation element to bend optical path of illumination light extending from the illumination optical system up to the spatial light modulation element by the reflection plane surface.

In this image display apparatus, since the optical path of illumination light extending from the illumination optical system to the spatial light modulation element is bent by the reflection plane surface, interference between optical path of the illumination light and the projection lens is prevented to have ability to reduce incident angle onto the spatial light modulation element of illumination light.

Another image display apparatus according to the present invention comprises a spatial light modulation element including reflection electrode, an illumination optical system including a polarization element, an integrator where plural elements are arranged in matrix form and a light source, and adapted for allowing illumination light emitted from the light source to be obliquely incident on the spatial light modulation element through the polarization element and the integrator, and a projection lens for forming an image of the spatial light modulation element, wherein aspect ratio of respective elements of the integrator is contracted (reduced) in a direction of tilt with respect to the spatial light modulation element of illumination light as compared to aspect ratio of the illumination range of the spatial light modulation element.

In this image display apparatus, illumination efficiency of the spatial light modulation element by the illumination optical system is increased.

Still more further objects of the present invention and practical merits obtained by the present invention will more apparent from the description of the embodiments which will be explained below with reference to the attached drawings.

BEST MODE FOR CARRYING OUT THE INVENTION

An image display apparatus according to the present invention will now be described in detail with reference to the attached drawings.

Figure 1:
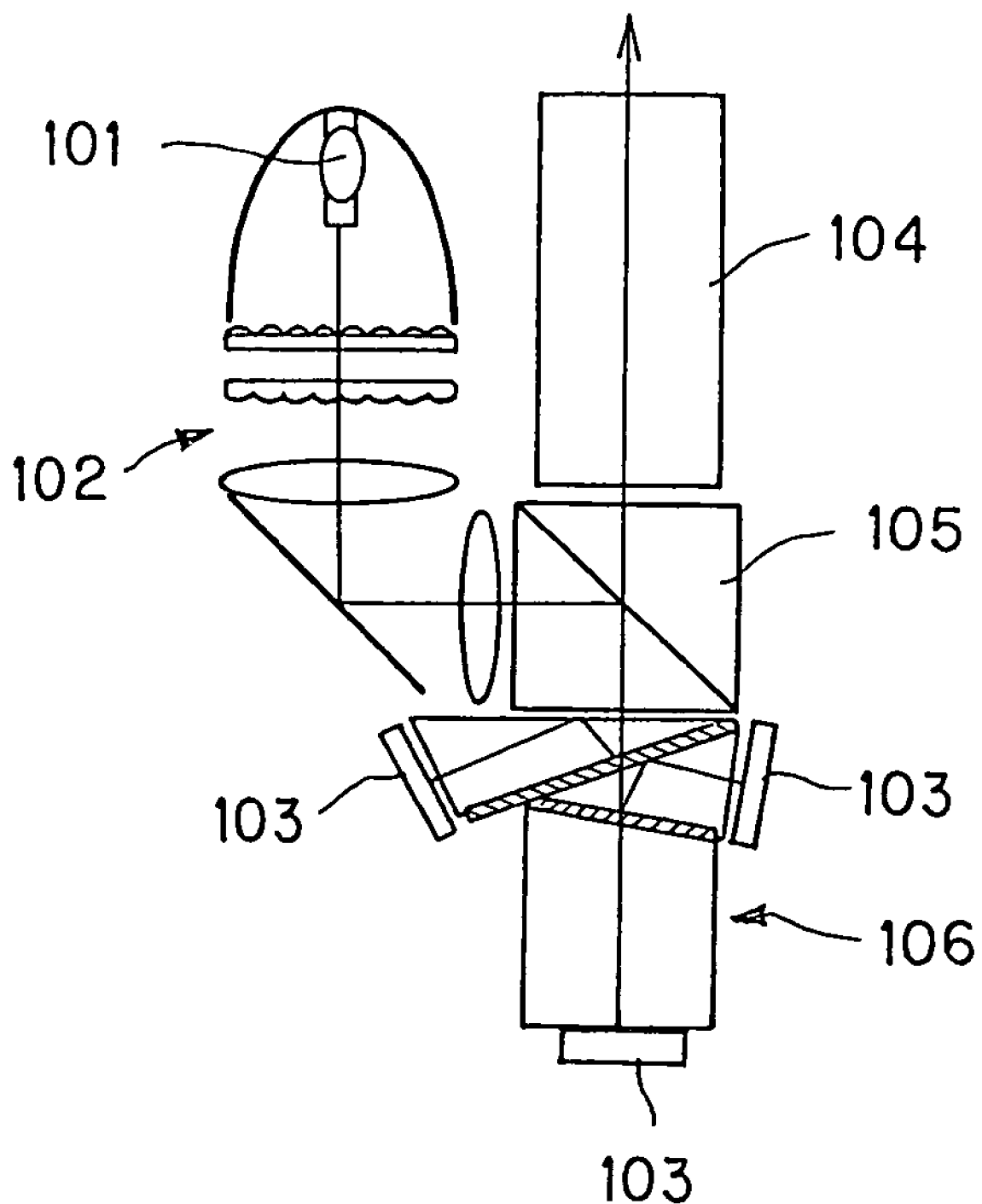
FIG. 1 is a side view showing the configuration of a conventional image display apparatus.
Figure 2:
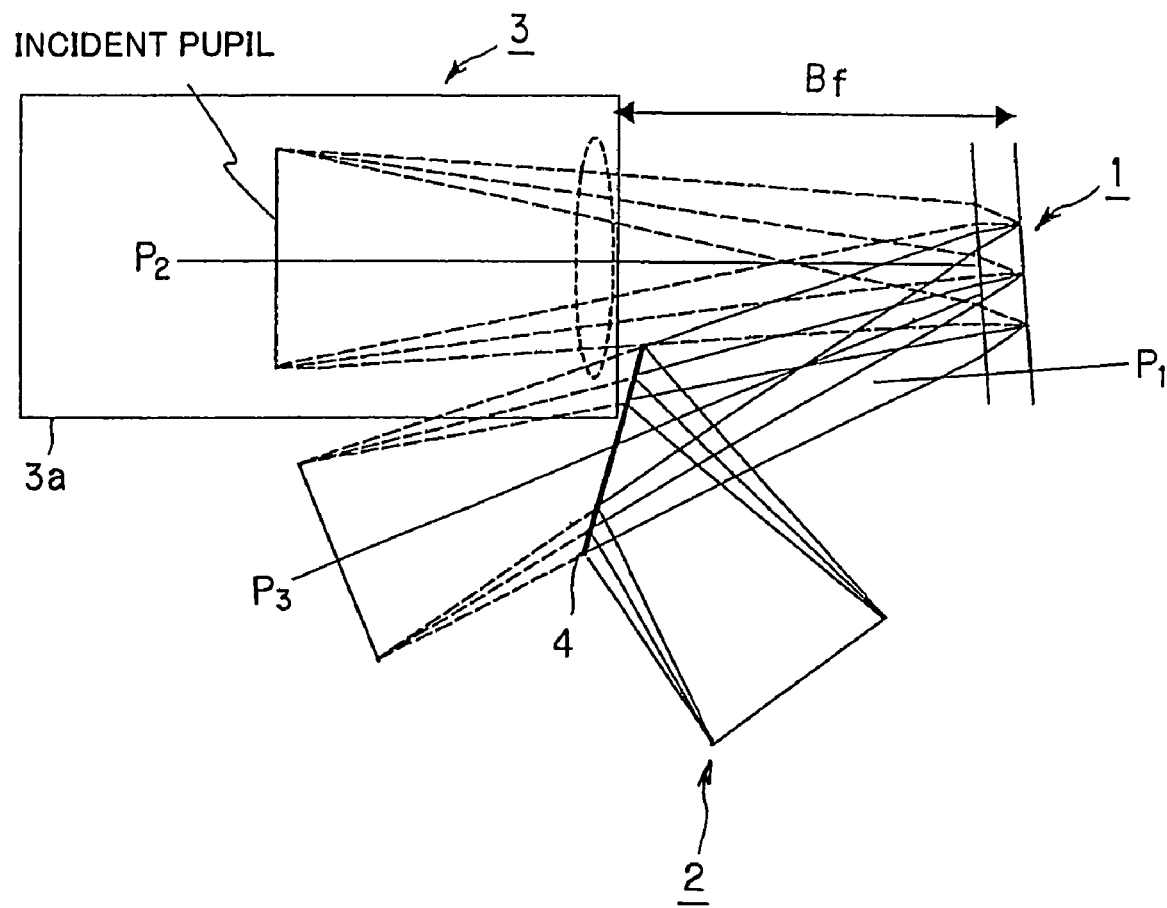
FIG. 2 is a side view showing the fundamental configuration of an image display apparatus according to the present invention.

As shown in FIG. 2, the image display apparatus according to the present invention is directed to an image display apparatus of the projection type comprising a spatial light modulation element including reflection electrode (hereinafter referred to as light valve), such as, for example, liquid crystal modulation element of the reflection type, an illumination optical system 2 for illuminating the light valve 1, and a projection lens 3 for forming image of the light valve 1. The illumination optical system 2 includes light source such as discharge lamp, etc. and polarization element which are not shown, and is caused to be of the configuration adapted for obliquely irradiating light beams that the light source has been emitted onto the light valve 1 as illumination light beams through the polarization element and plural optical elements. The illumination light beams are linearly polarized light beams. Further, the projection lens 3 projects image of the light valve 1 onto screen (not shown) to form image.

The image display apparatus includes a reflection plane surface 4 for bending an optical path of illumination light beams so as to prevent illumination light beams emitted from the illumination optical system 2 from being screened or shielded by mirror cylinder 3a of the projection lens 3. This reflection plane surface 4 is disposed at a position nearest to backward bulb of the projection lens 3 (lens of the light valve 1 side) so as to prevent illumination light beams and modulated light beams reflected by the light valve 1 from crossing while minimizing tilt angle with respect to the display surface of light valve 1 of illumination light beams. The reflection plane surface 4 is disposed so as to take such an angle that illumination light beams from the illumination optical system 3 do not overlap with color separation prism provided between the light valve 1 or the illumination optical system 2 and the light valve 1.

Because the reflection plane surface 4 is provided as described above, the image display apparatus according to the present invention can suppress, as minimum as possible, tilt angle with respect to the display surface of the light valve 1 of illumination light beams from the illumination optical system 2 irrespective of the size of mirror cylinder 3a of the projection lens 3. It is to be noted that tilt angle with respect to the display surface of the light valve 1 of illumination light beams is determined by taking, into consideration, F number of the illumination optical system 2, back focus Bf of the projection lens 3 and degree of margin of assembling, etc.

Since the image display apparatus according to the present invention uses the so-called eccentric optical system, compact optical system can be realized. Namely, at the incident side of illumination light beams of the light valve 1, field lens at the illumination optical system 2 is disposed. In this case, the field lens doubles as the field lens of the projection lens 3. The field lens is disposed for the purpose of realizing telecentric optical system at the reflection surface of the light valve 1. The reflection plane surface of the light valve 1 is tilted with respect to the optical axis $P_2$ of the projection lens 3, etc. in the state where the optical axis $P_1$ of the field lens is suitably shifted with respect to the optical axis $P_2$ of the projection lens 3, or the optical axis $P_1$ of the field lens and the optical axis $P_2$ of the projection lens 3 are caused to be in correspondence with each other to realize tilt (oblique) illumination with respect to the light valve 1. Shift and tilt of the optical axis $P_1$ of the filed lens with respect to the optical axis $P_2$ of the projection lens 3 and the light valve 1 position affect MTF of the projection lens 3, characteristic of image distortion, etc., aperture and tilt projection ratio, etc. For this reason, the illumination optical system 2 cannot be independently designed, but is designed also in consideration of the projection optical system 3.

In this case, in the apparatus shown in FIG. 2, $P_3$ indicates the optical axis of the illumination optical system 2, and 3b indicates incident pupil of incident lens.

In the image display apparatus according to the present invention, in the case where the liquid crystal modulation element is used as the light valve 1, circular polarization plate is disposed in correspondence with the liquid crystal modulation element. For one liquid crystal modulation element, one circular polarization plate is disposed. The circular polarization plate performs function of polarizer with respect to light beams incident on the liquid crystal modulation element by the illumination optical system 2, and performs function of analyzer with respect to light beams reflected by the liquid crystal modulation element and incident on the projection lens 3. In the image display apparatus, modulation of incident light beams is performed by one circular polarization plate and liquid crystal modulation element.

For example, if transmitted light of circular polarization plate is assumed to be counterclockwise circular polarized light (LCP), the phase of rays of light which have been reflected at the reflection surface electrode without undergoing phase change at the liquid crystal layer of the liquid crystal modulation element is changed by 180° so that there results clockwise circular polarized light (RCP). Accordingly, such rays of light are not transmitted through the circular polarization plate. Namely, phase change ranging from 0° to 90° is caused to take place at the liquid crystal layer of the liquid crystal modulation element, thereby making it possible to perform modulation from black level up to white level at light beams which have been transmitted through the circular polarization plate via the liquid crystal modulation element. By producing predetermined phase changes every pixels at the liquid crystal modulation element, it is possible to perform image display on the screen.

The circular polarization plate can be constituted by linear polarization plate, and ¼ λ (wavelength) plate. As the linear polarization plate, there may be employed either absorption type linear polarization plate serving to absorb linear polarized light in a predetermined one direction and to allow polarized light in other direction to be transmitted therethrough, or reflection type linear polarization plate serving to reflect linear polarized light in a predetermined one direction and to allow polarized light in other direction to be transmitted therethrough. In this example, there may be used reflection type circular polarization plate consisting of cholesteric liquid crystal polymer.

Two kinds of configurations are conceivable in dependency upon the positional configuration between the field lens and circular polarization plate. Namely, there exist the configuration in which the circular polarization plate is disposed between the field lens and the liquid crystal modulation element, and the configuration in which the circular polarization plate is disposed between the field lens and the projection lens.

Figure 3:
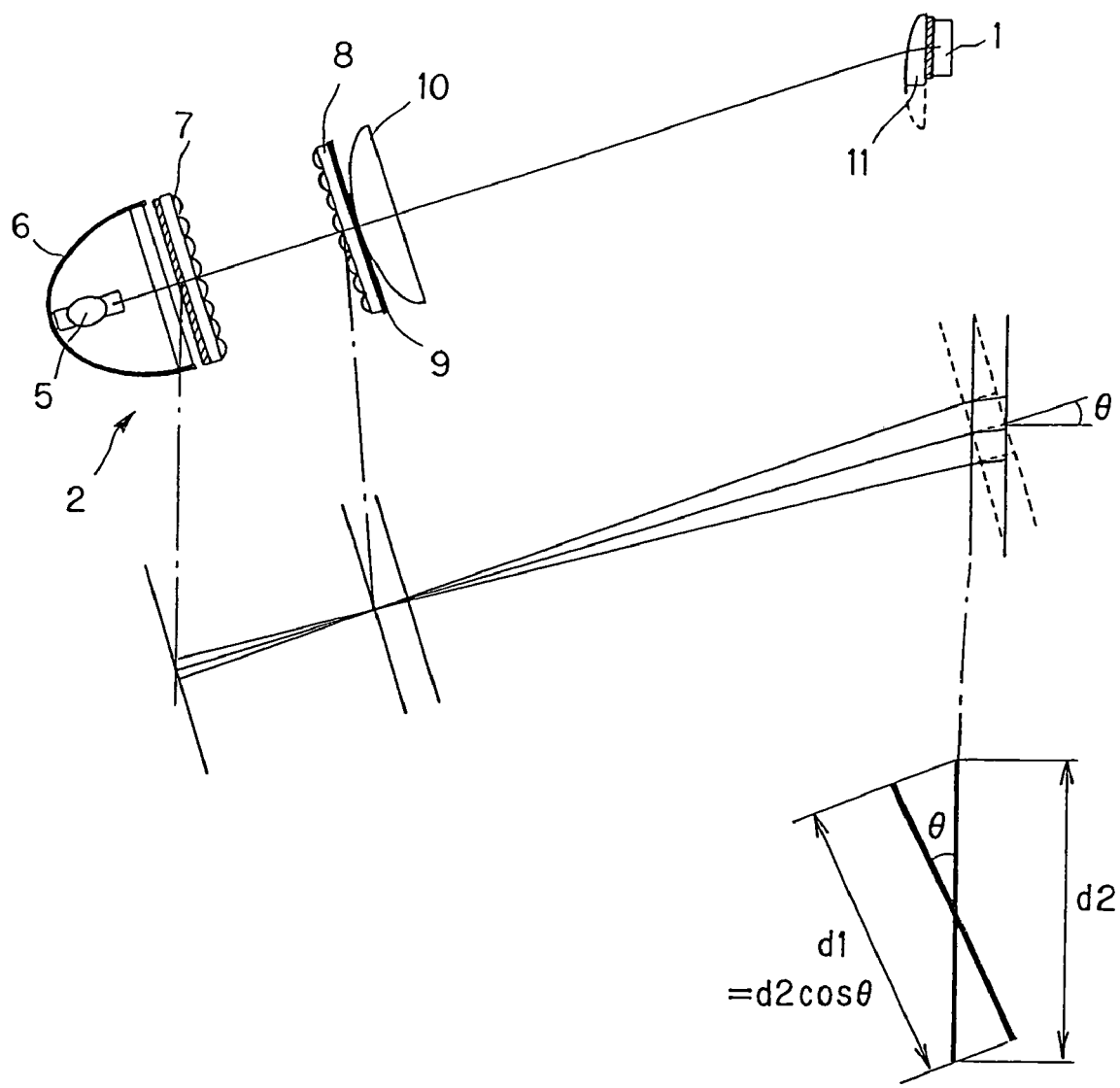
FIG. 3 is a side view showing the fundamental configuration of illumination optical system used in the image display apparatus according to the present invention.

In order to improve efficiency for illuminating the light valve 1, as shown in FIG. 3, the illumination optical system 2 of the image display apparatus according to the present invention includes first and second fly-eye lenses 7, 8 serving as integrator (fly-eye integrator or rod integrator) in which plural elements are arranged in a matrix form. Namely, light beams emitted from the light source 5 are changed into substantially parallel light beams by the parabolic mirror 6, and are obliquely incident on the light valve 1 via the field lens 10, 11 through the integrators 7, 8 and the polarization element 9.

In this illumination optical system 2, respective elements of the first fly-eye lens 7 form an image of illumination light beams onto the display surface of the light valve 1 serving as body to be illuminated. In this image display apparatus, since the display surface of the light valve 1 is tilted with respect to the optical axis of illumination light beams as indicated by θ in FIG. 3, this display surface has broad illumination range in the tilt direction as compared to the case of the co-axial system so that illumination efficiency is lowered.

Figure 4:
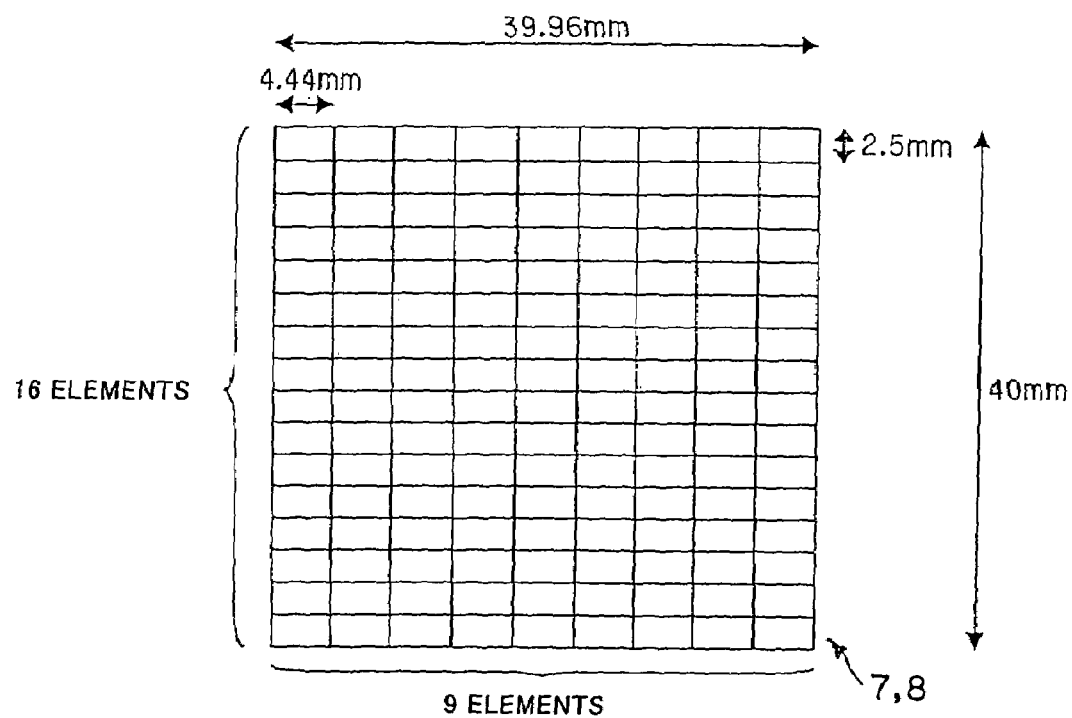
FIG. 4 is a front view showing general configuration of integrator used in the illumination optical system of the present invention.
Figure 5:
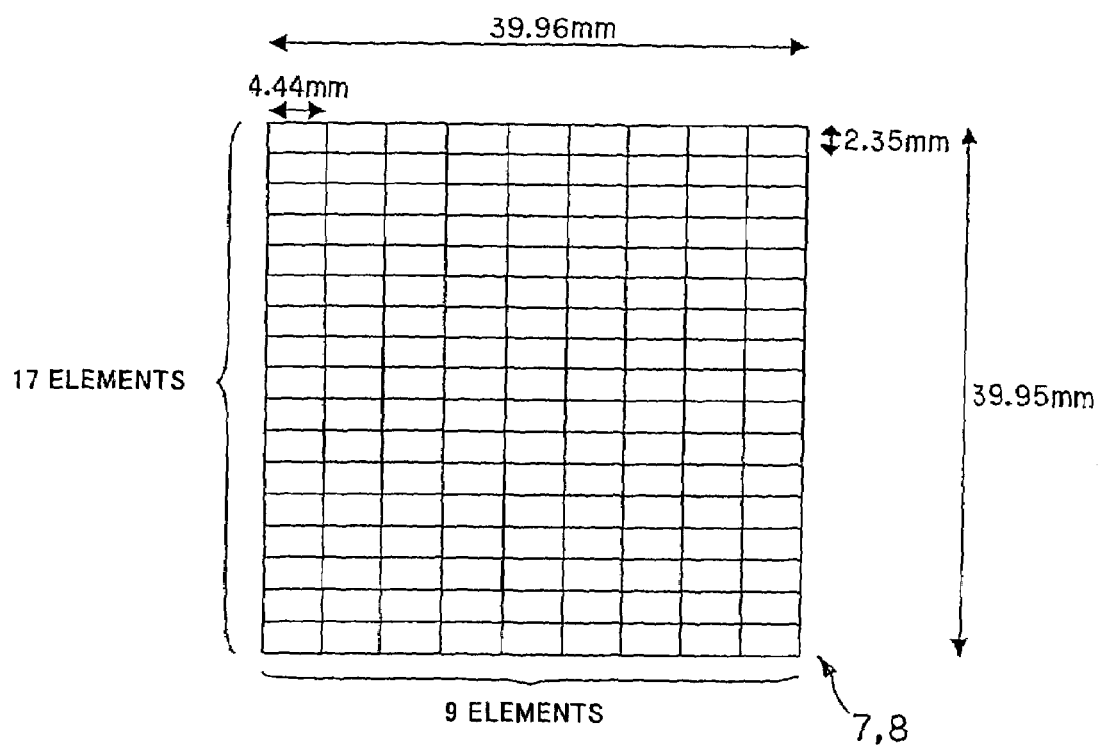
FIG. 5 is a front view showing the configuration of integrator used in the illumination optical system of the present invention.

In view of the above, in the illumination optical system 2, the aspect ratio of respective elements of integrators 7, 8 is contracted (reduced) in tilt direction with respect to the light valve 1 of the optical axis of illumination light beams, as shown in FIG. 5, with respect to the aspect ratio of respective elements of the ordinary integrator shown in FIG. 4 which is equal to the aspect ratio of the illumination range of the light valve 1.

When ratio with respect to tilt direction relative to the light valve 1 of the optical axis of illumination light beams at these aspect ratios is assumed to be [d1/d2], the following relationship is provided when tilt angle is θ.

$$d1/d2 = \cos\theta$$

Namely, the form of respective elements of fly-eye lenses 7, 8 results in form corresponding to value multiplied by cos θ in regard to tilt direction with respect to the form of respective elements of the ordinary integrator. Meanwhile, when illumination range in the case where the optical axis of illumination light beams is not inclined on (is incident perpendicular to) the light valve is d1, the illumination range in the case where the optical axis of illumination light beams is tilted by θ with respect to the light valve is expressed as [d1/cos θ]. This illumination range results in d2.

In the illumination optical system, as the result of the fact that the aspect ratio of respective elements of the integrators 7, 8 is adjusted as described above, spreading of the illumination range in tilt direction with respect to the light valve of the optical axis of illumination light beams is suppressed. Thus, lowering of illumination efficiency is prevented.

Then, practical configuration of the image display apparatus according to the present invention will now be explained with reference to the attached drawings.

The image display apparatus according to the present invention can be caused to be of the configuration in which circular polarization plate 13 is disposed between field lens 11 and light valve 1. This image display apparatus includes an illumination optical system 2 composed of light source 5, parabolic mirror 6, integrators 7,8 polarization element 9 and field lens 10, reflection plane surface (reflection plate) 4 for bending illumination light beams emitted from the illumination optical system 2, light valve 1 illuminated by illumination light beams through field lens 11 and cross-dichroic prism 12, and projection lens 3 for projecting image of the light valve 1 onto screen (not shown).

In this example, as the circular polarization plate 13 and the light valve 1, there are respectively disposed in total three circular polarization plates 13 and three light valves 1 in three directions of the cross-dichroic prism 12 in correspondence with three colors (R, G, B) which have been color-separated by the cross-dichroic prism 12.

The reflection plane surface 4 is disposed on an optical path between the illumination optical system 2 and the light valve 1 and in the vicinity of the rear end portion of the projection lens 3.

Figure 7:
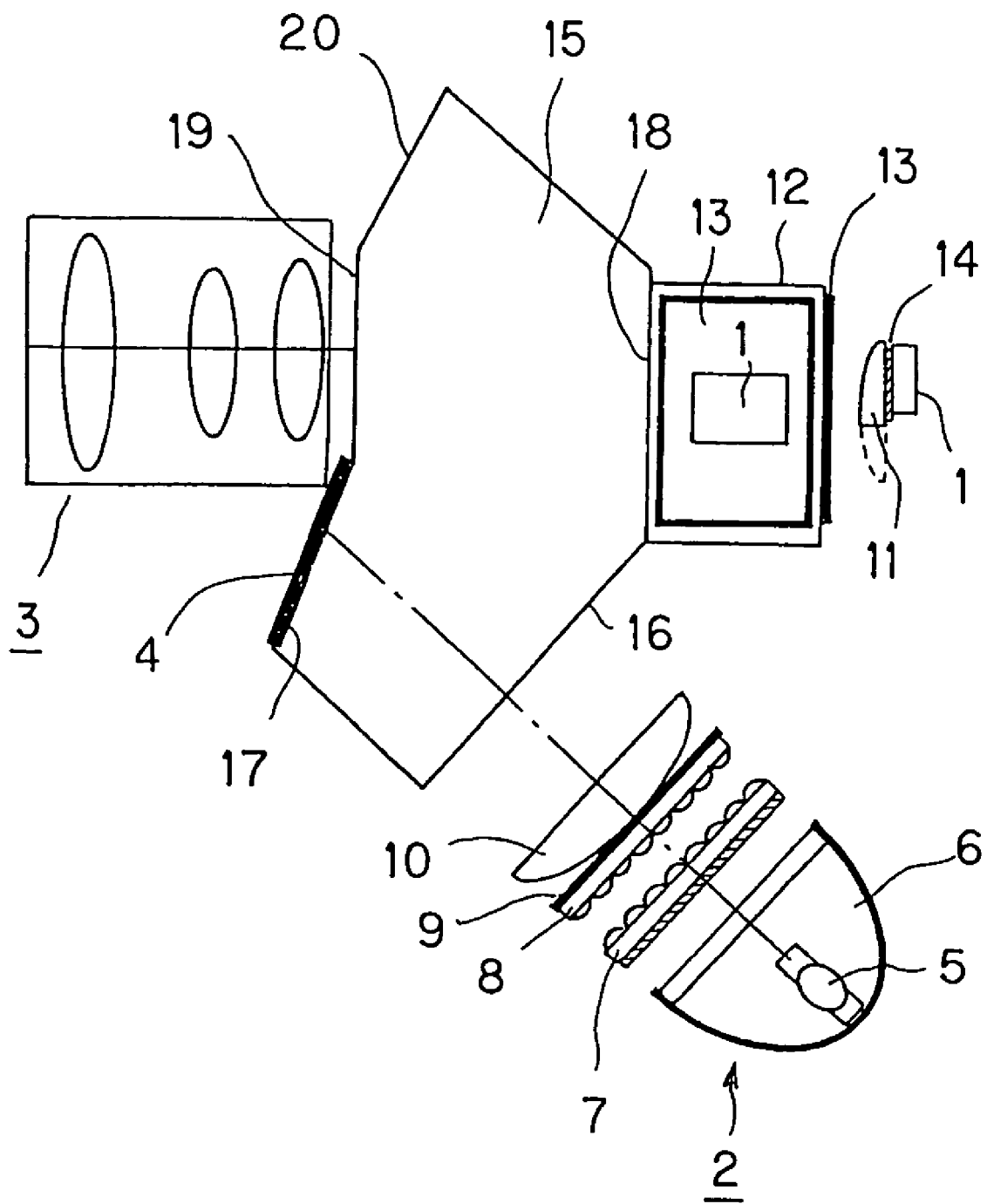
FIG. 7 is a side view showing another practical configuration of the image display apparatus according to the present invention.

As shown in FIG. 7, the image display apparatus according to the present invention may be caused to be of the configuration in which circular polarization plate 13 is disposed between projection lens 3 and filed lens 11. In this case, the field lens 11 and the light valve 1 are optically coupled.

In the image display apparatus shown in FIG. 7, a transparent optical block 15 is disposed between the cross-type dichroic prism 12 and the projection lens 3. The transparent optical block 15 is formed by material having the same refractive index as that of the cross-type dichroic prism 12. Surfaces 18 opposite to each other of these transparent optical block 15 and the cross-type dichroic prism 12 are optically coupled by adhesive agent having substantially the same refractive index as that of the transparent optical block 15 and the cross-type dichroic prism 12.

Figure 6:
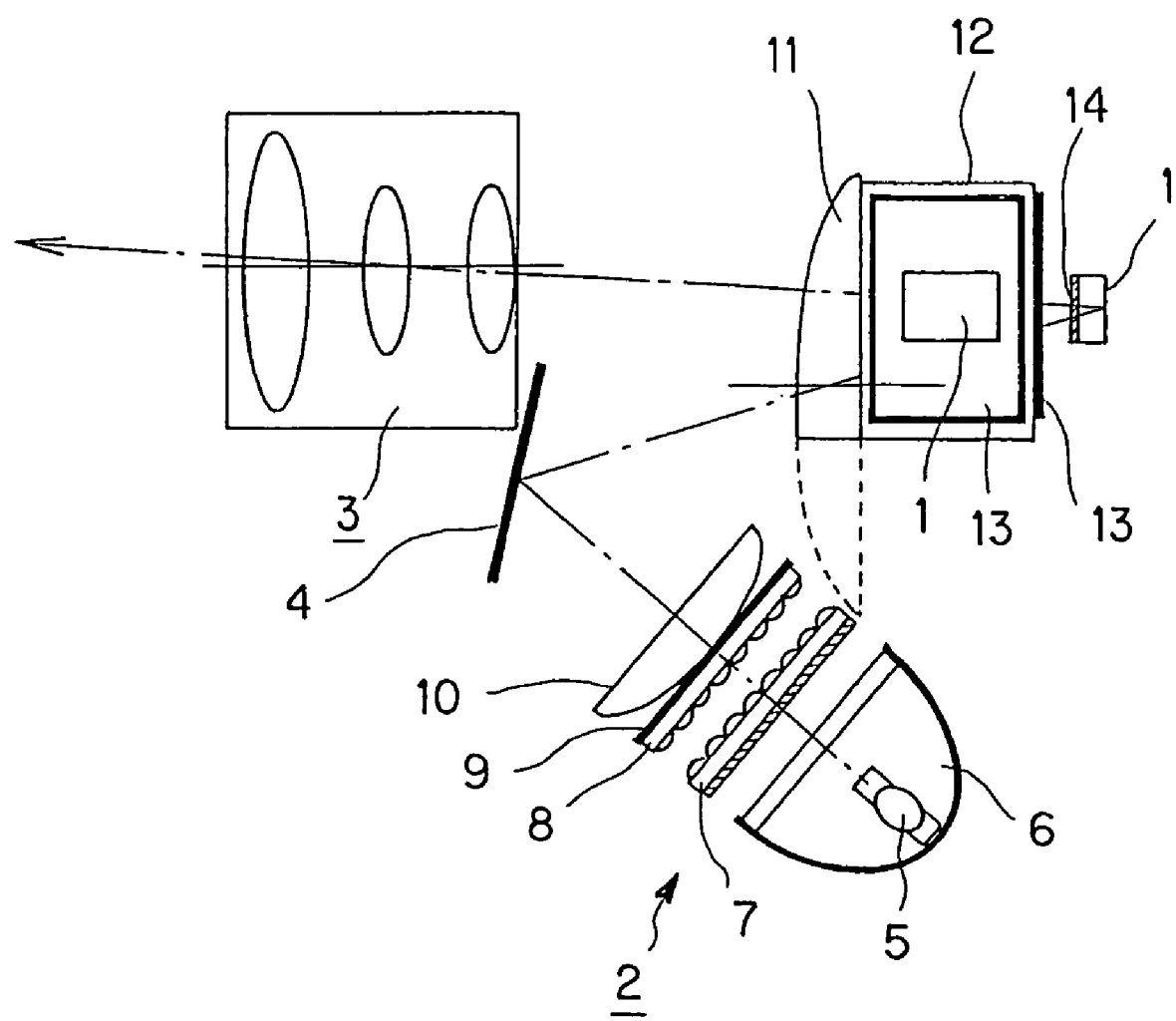
FIG. 6 is a side view showing practical configuration example of image display apparatus according to the present invention.

Similarly to the above-described apparatus shown in FIG. 6, the illumination optical system 2 comprises light source 5, parabolic mirror 6, integrators 7, 8, polarization element 9 and filed lens 10. As circular polarization plate 13, filed lens 11 and light valve 1, there are respectively disposed in total three circular polarization plates 13, three field lenses 11 and three light valves 1 in three directions of the cross dichroic prism 12 in correspondence with three colors (R, G, B) which have been color-separated by the cross dichroic prism 12.

Figure 8:
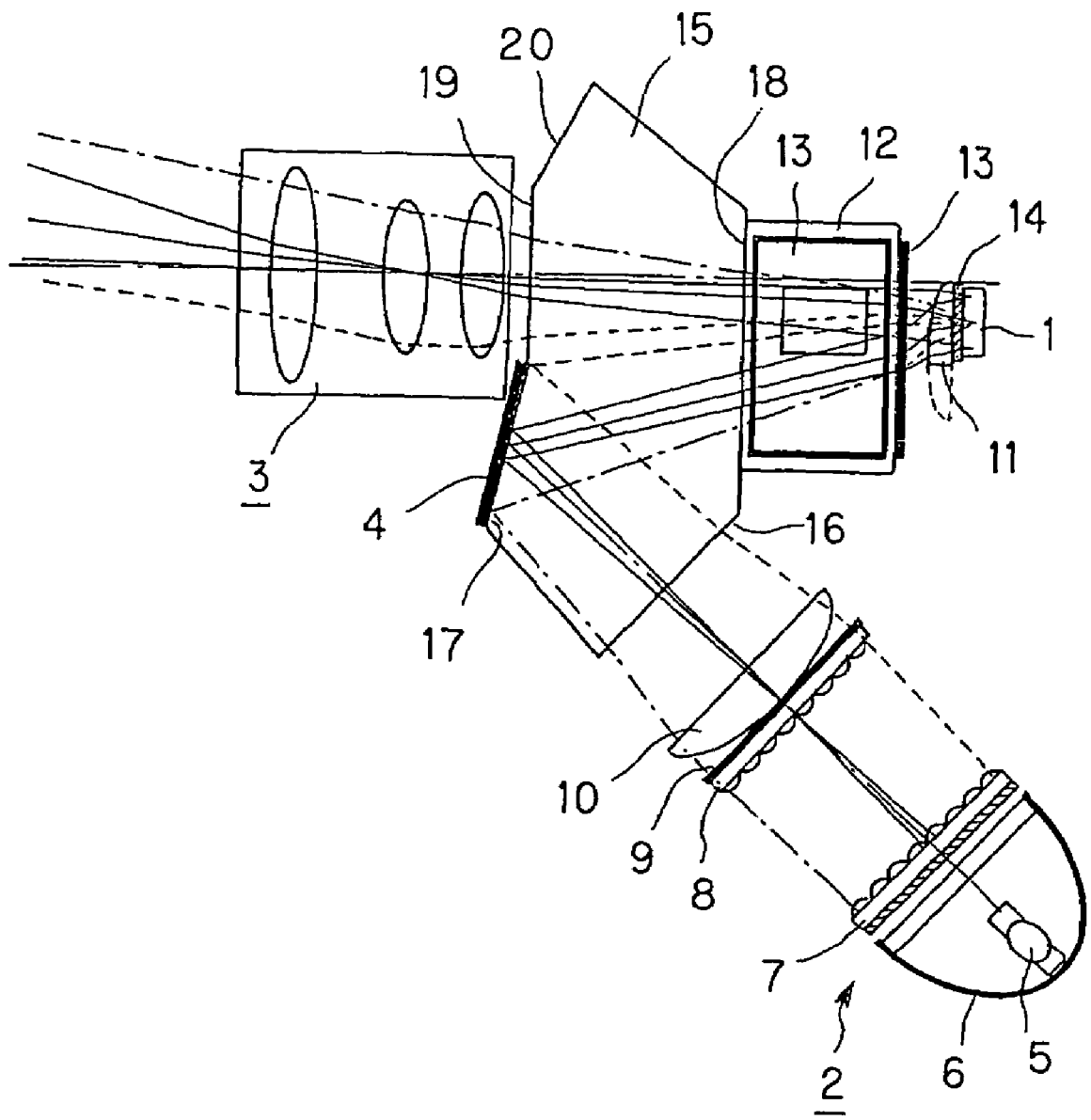
FIG. 8 is a side view showing optical path of illumination light beams in another practical example of the image display apparatus according to the present invention.

In the image display apparatus shown in FIG. 7, as shown in FIG. 8, illumination light beams from the illumination optical system 2 are incident from incident plane surface 16 of transparent optical block 15 into the transparent optical block 15. At the plane surface 17 substantially opposite to the incident plane surface 16 of the transparent optical block 15, reflection surface 4 is formed. The illumination light beams are reflected and bent by the reflection surface 4 and are outgoing toward surface 18 connected to the cross-type dichroic prism 12. The reflection plane surface 4 is disposed at the position on an optical path between the illumination optical system 2 and the light valve 1, and in the vicinity of the rear end portion of the projection lens 3.

The illumination light beams which have been emitted from the surface 18 of the transparent optical block 15 and have been incident onto the cross-type dichroic prism 12 are color-separated by the cross-type dichroic prism 12, and are incident onto the light valves 1 corresponding to respective colors via field lenses 11 corresponding to respective colors.

The rays of modulated light which have been modulated and reflected at respective light valves 1 are incident on the cross-type dichroic prism 12, at which they are color-synthesized. The light thus synthesized is incident on the transparent optical block 15 via surface 18 of the transparent optical block 15 connected to the cross-type dichroic prism 12. The modulated light is emitted from outgoing surface 19 of the transparent optical block 15 opposite to the surface 18, and is incident on the projection lens 3. The projection lens 3 projects incident modulated light onto screen (not shown) to form an image of the light valve 1 on the screen.

Figure 9:
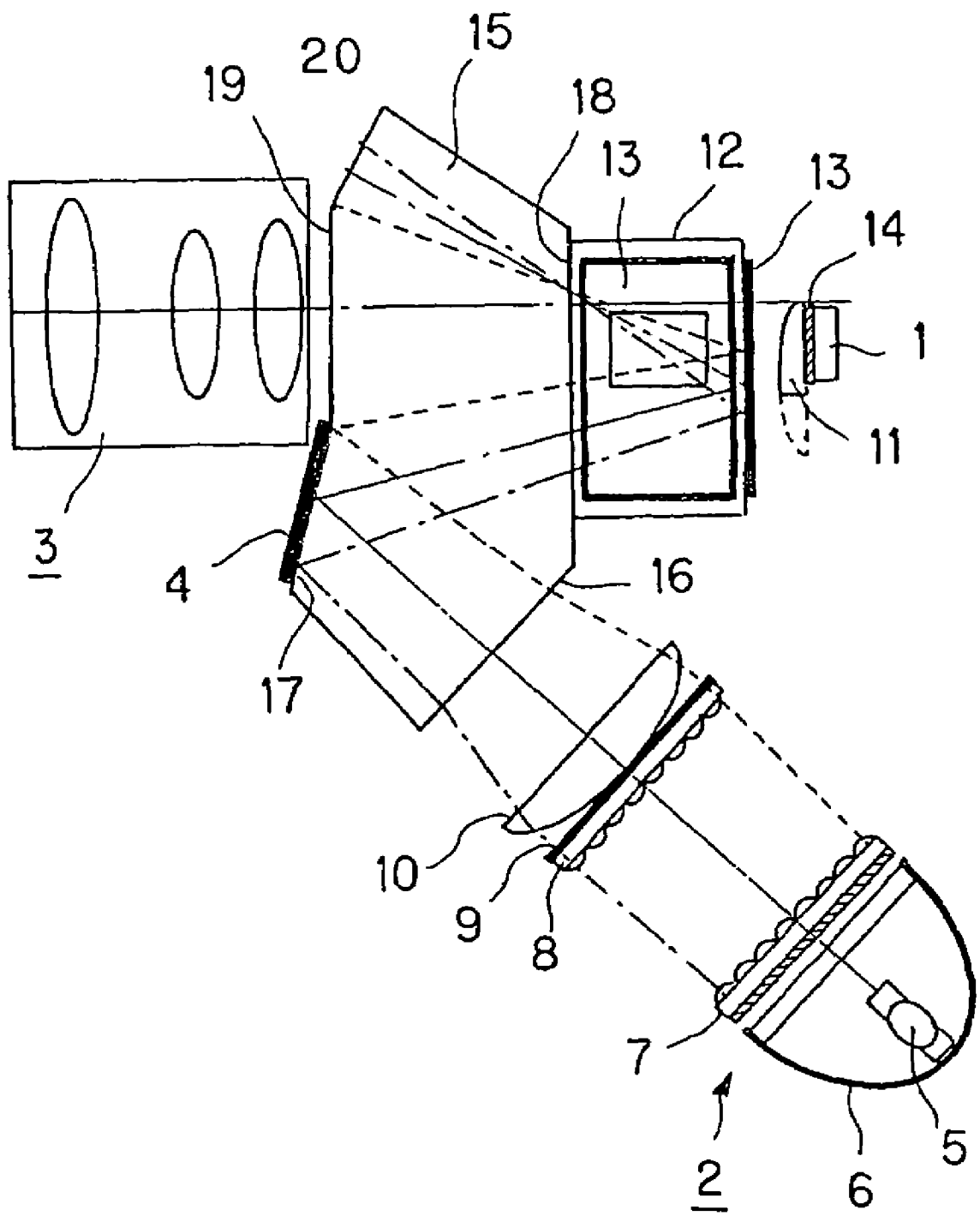
FIG. 9 is a side view showing optical path of unnecessary light in another practical example of the image display apparatus according to the present invention.

In the image display apparatus shown in FIG. 7, there is no possibility that illumination light beams from the illumination optical system 2 may be screened or shielded by mirror cylinder of the projection lens 3. In the image display apparatus, as shown in FIG. 9, illumination light beams which have been reflected on the inner surface of the cross-type dichroic prism 12 so that they do not reach the light valve 1 are emitted from unnecessary light outgoing surface 20 of the transparent optical block 15 toward the external side, so there is no possibility that those illumination light beams are incident into the incident pupil of the projection lens 3. Accordingly, lowering of the contrast of display image is prevented.

In the image display apparatus constituted as shown in FIG. 7, there exist several factors which lower contrast of display image. When illumination light beams from the illumination optical system 2 are reflected at the surface before they are passed through the circular polarization plate 13 such as surface, etc. of the circular polarization plate 13, and are directly incident on the projection lens 3, contrast of display image is lowered. Such reflection becomes conspicuous in the case where reflection type polarization plate is used as circular polarization plate.

In order to improve the contrast of display image, it is necessary to suppress occurrence of reflected light beams at respective optical parts as described above, or to prevent reflected light beams at respective optical parts from being incident on the incident pupil of the projection lens. With respect to reflection at the surface of optical parts, reflection at the surface between air and optical parts become most problem. By arrangement of the optical system, it is possible to prevent such reflected light beams from being incident on the incident pupil of the projection lens.

Namely, in the image display apparatus shown in FIG. 7, angle of outgoing surface 20 of the transparent optical block 15 is determined so that reflection of unnecessary light reflected by the circular polarization plate 13 becomes small, unnecessary light is not incident on the projection lens 3.

Then, an example of an apparatus employing arrangement of optical element of the above-described image display apparatus shown in FIG. 7 and employing the following numerical settings and material.

In the image display apparatus, illumination size by the illumination optical system 2 was set to 0.5 inches (16:9). F number of the illumination optical system was set to F2.4. Incident pupil diameter of the projection lens 3 was set to 40 mm. Shift quantity of the field lens 11 was set to 11.2 mm with the optical axis of the projection lens 3 being as reference.

Figure 10:
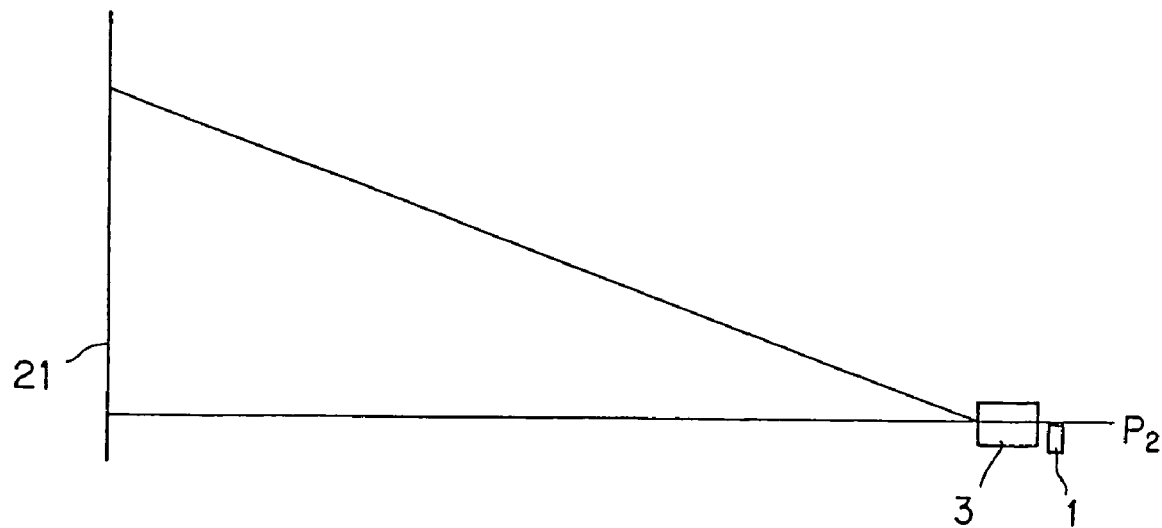
FIG. 10 is a side view for explaining shift quantity of illumination optical system of the present invention.

Area shift quantity for tilt projection display of the light valve 1 was set to 100% as shown in FIG. 10, i.e., the edge portion of the display surface (reflection surface) of the light valve 1 was placed in the state where it is located on the optical axis P₂ of the projection lens 3. Tilt quantity of reflection surface of the light valve 1 is 4.7°. Tilt quantity of the reflection surface 4 is 10° with respect to the optical axis $P_2$.

As nitric material constituting the field lens 11, "SF03" is used. Curvature of radius R of the field lens 11 is 90 mm. As nitric material constituting the transparent optical block 15, "BK7" is used. In the case where the cross-type dichroic prism 12 is formed by nitric material, "BK7" is used as nitric material.

The light valve 1 has a tilt angle of 22.5° with respect to the optical axis $P_3$ of the illumination optical system 2. The aspect ratio of the light valve 1 is 16:9, and the illumination optical system 2 is tilted in short-axis direction of the light valve 1 with respect to the light valve 1.

The aspect ratio of respective elements of fly-eye lenses constituting integrators 7, 8 is 16:8.3 (=9×cos 22.5°). Since the outer appearance size of the fly-eye lens is determined by size of the light source, the number of respective elements may be convenient number of elements. For example, as shown in FIG. 5, dimensions of respective elements may be 4.44 mm×2.35 mm, the number of elements in longitudinal direction may be 17 and the number of elements in horizontal direction may be 9, and outer appearance sizes may be 39.95 mm×39.95 mm. In the case where the aspect ratio of respective elements is not adjusted, since outer appearance sizes are 4.44 mm×2.5 mm as shown in FIG. 4, ratio of 94% in longitudinal direction is provided by adjustment of the aspect ratio.

Figure 11:
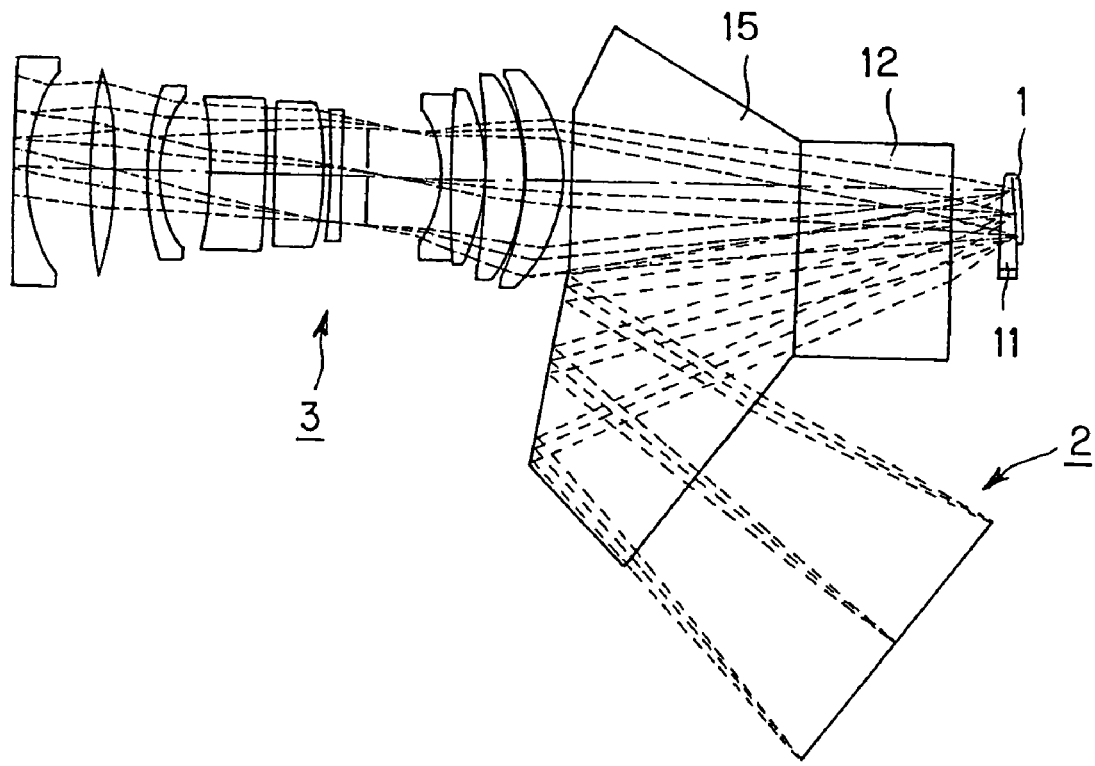
FIG. 11 is a side view showing the configuration including the configuration of projection lens of the present invention.

It is to be noted that the fact that the field lens 11 is shifted with respect to the optical axis of the projection lens 3 and the fact that the reflection surface of the light valve 1 is tilted are the same as a function to separate illumination light beams and modulated light. When attempt is made to obtain the same eccentric quantity only by shift of the field lens 11, there are problems that shift quantity is greatly increased and diameter of the field lens 11 is enlarged so that cost is increased, and aberration of the field lens 11 is increased so that the characteristic of the projection lens 3 is deteriorated and the illumination efficiency is also lowered. Moreover, when attempt is made to obtain the same eccentric quantity only by tilt of the reflection surface of the light valve 1, picture distortion and/or image surface curve become large to deteriorate the characteristic of the projection lens 3. Accordingly, by combining shift of suitable quantity of the field lens 11 and tilt of the reflection surface of the light valve 1, it also becomes possible to correct image surface curve. Thus, the characteristic of the projection lens 3 can be improved. It is to be noted that, as actual design example, as shown in FIG. 11, the projection lens 3 may be realized by, e.g., the lens configuration of nine group consisting of ten lenses.

Figure 12:
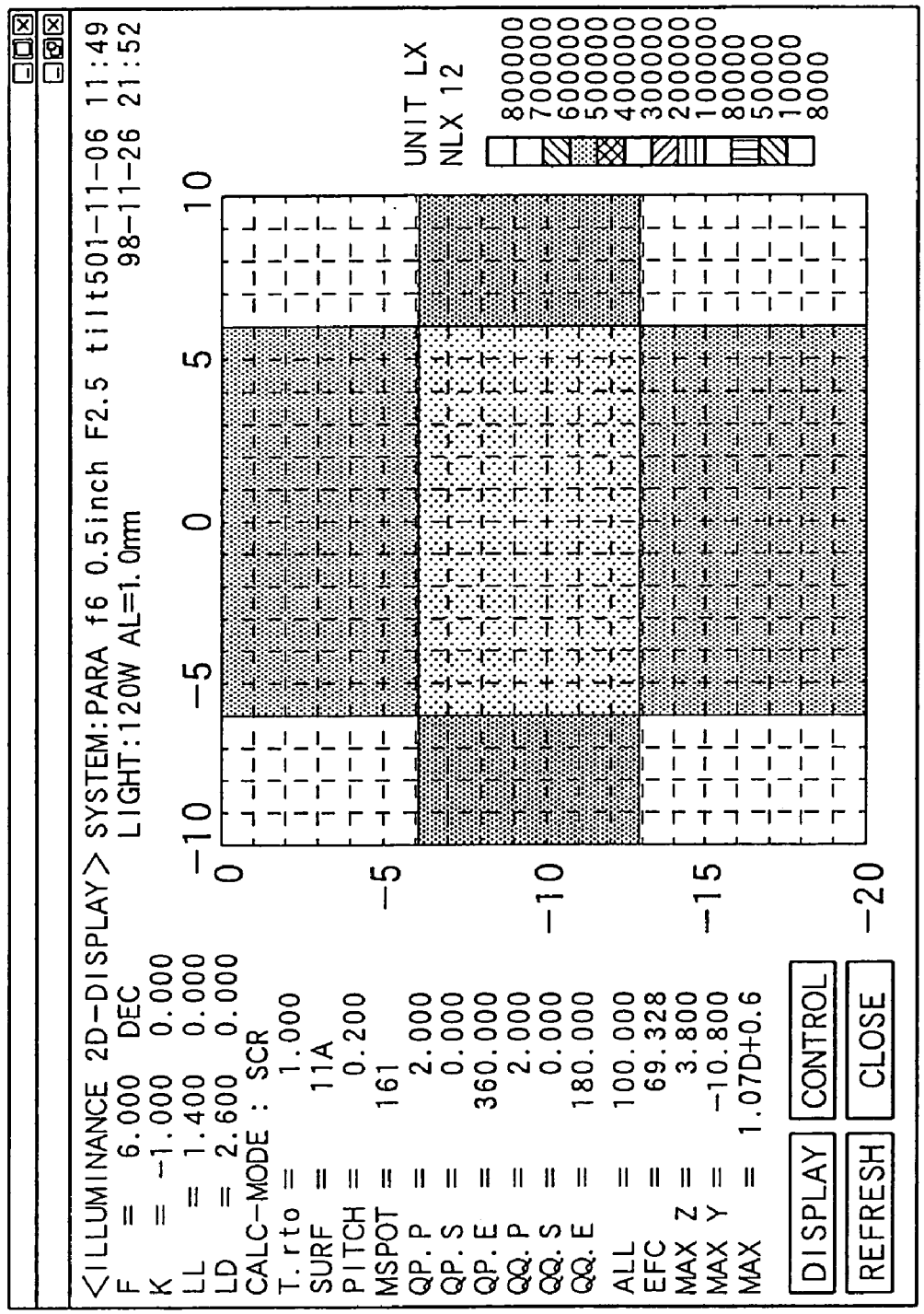
FIG. 12 is front view showing illumination pattern by illumination optical system in the case where aspect ratio of respective elements of integrator of the present invention has been adjusted.
Figure 13:
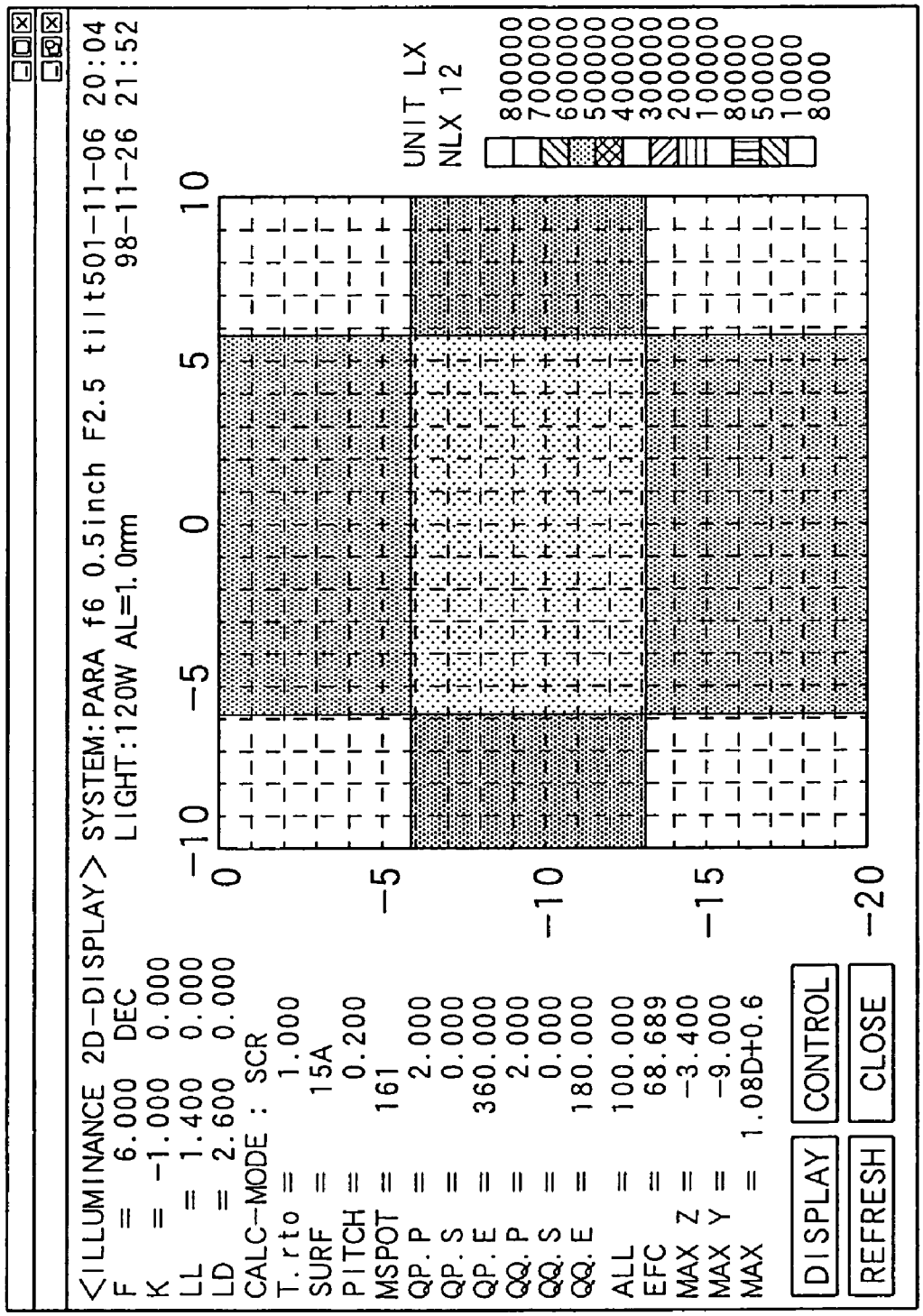
FIG. 13 is a front view showing illumination pattern by illumination optical system in the case where aspect ratio of respective elements of integrator of the present invention is not adjusted.
Figure 14:
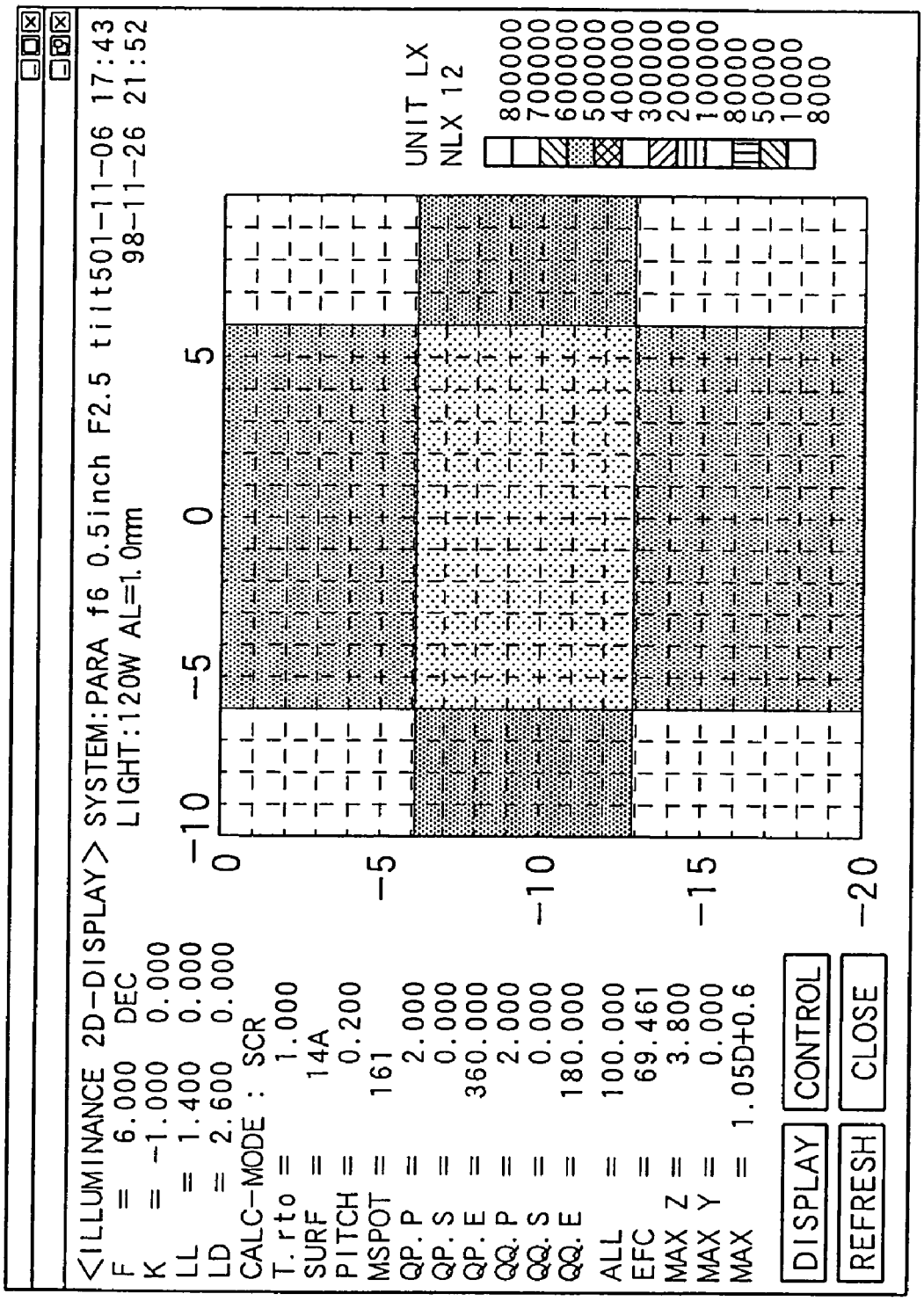
FIG. 14 is a front view showing illumination pattern by illumination optical system having no tilt of the present invention.

As shown in FIG. 12, as compared to illumination pattern in the case where adjustment of the aspect ratio is not made, which is shown in FIG. 13, illumination pattern at the position of the light valve 1 of the image display apparatus is caused to become in correspondence with tilt of the reflection plane surface of the light valve 1 by adjustment of the aspect ratio of respective elements of the fly-eye lens. Thus, improvement in illumination efficiency can be realized. It is to be noted that, in this image display apparatus, substantially the same efficiency as illumination efficiency at the illumination pattern in the non-eccentric illumination shown in FIG. 14 can be obtained by adjustment of the aspect ratio of respective elements of the fly-eye lens.

Figure 15:
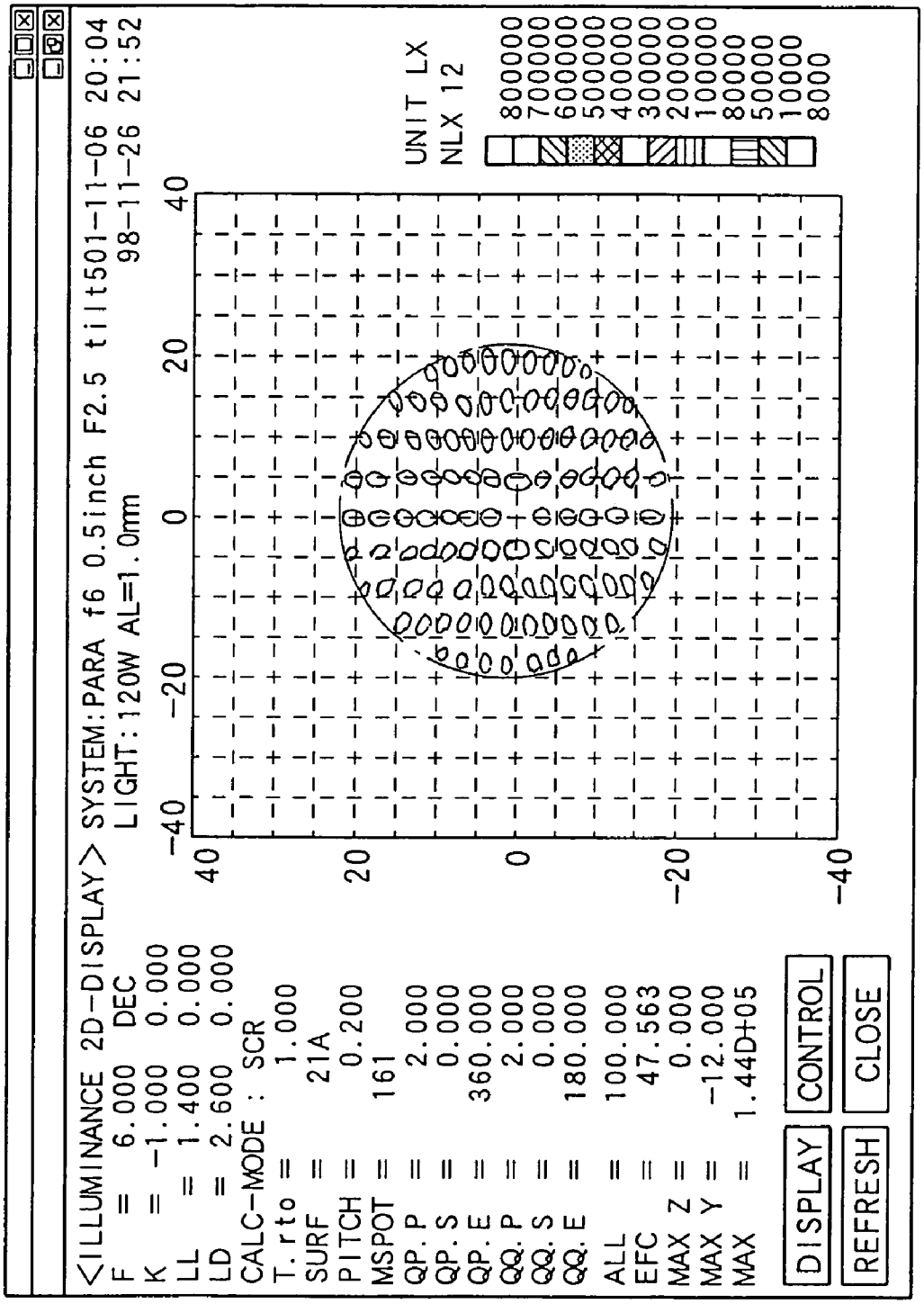
FIG. 15 is a front view showing illuminance distribution at incident pupil of projection lens in the case where the aspect ratio of respective elements of integrator of the present invention has been adjusted.
Figure 16:
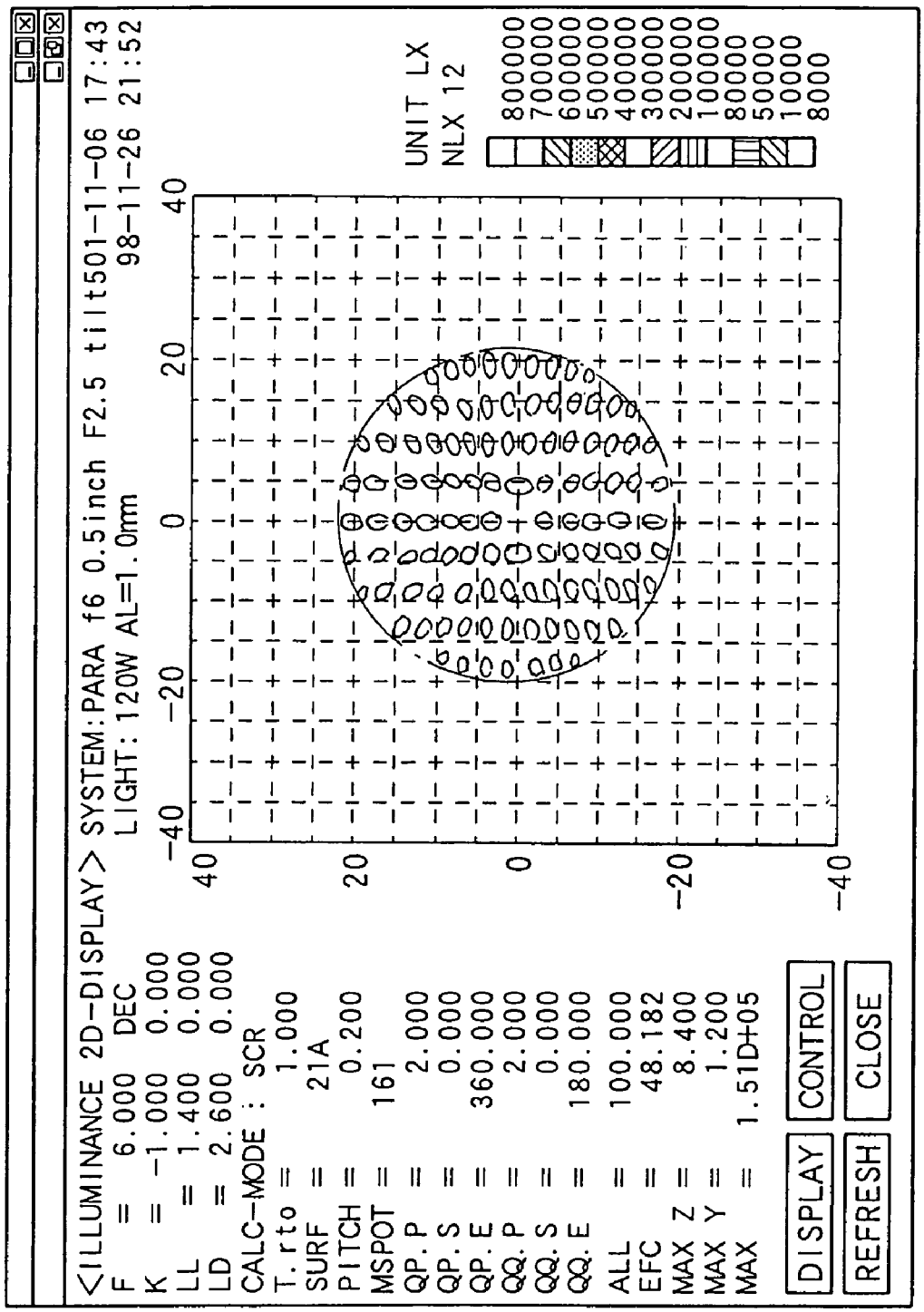
FIG. 16 is a front view showing illuminance distribution of illumination light beams at incident pupil of the projection lens in the case where aspect ratio of respective elements of integrator of the present invention is not adjusted.

As the illumination pattern at the incident pupil position of the projection lens 3 of the image display apparatus, substantially the same illumination pattern as illumination pattern in the non-eccentric illumination optical system shown in FIG. 16 can be obtained as shown in FIG. 15. Accordingly, in this image display apparatus, it is understood that efficiency through the projection lens 3 is equal to efficiency in the case where non-eccentric illumination optical system is used. In addition, in this image display apparatus, also in the design of the projection lens 3, it is also understood that substantially the same design as design in the case where non-eccentric illumination optical system is used can be made.

It is to be noted that while the invention has been described in accordance with preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth by appended claims.

Industrial Applicability,

As described above, in the image display apparatus according to the present invention, since optical path of illumination light extending from the illumination optical system to the spatial light modulation element is bent by the reflection plane surface, interference between optical path of illumination light and projection lens is prevented. As a result, incident angle onto the spatial light modulation element of illumination light can be reduced. Thus, characteristic deterioration of the projection lens can be reduced. Further, lowering of the contrast of display image can be suppressed.

In the image display apparatus according to the present invention, since the aspect ratio of respective elements of the integrator of the illumination optical system is contracted (reduced) in a direction of tilt with respect to spatial light modulation element as compared to the aspect ratio of the illumination range of the spatial light modulation element, illumination efficiency of the spatial light modulation element by the illumination optical system can be enhanced.

In the present invention, bright illumination optical system having low F number can be used, and lowering of the light utilization efficiency at the color separation/synthesis element is lowered. Thus, image display apparatus capable of performing bright image display can be constituted.

The invention claimed is:

1. An image display apparatus comprising:
    a spatial light modulation element including a reflection electrode;
    an illumination optical system including a polarization element, an integrator in which plural elements are arranged in a matrix form, and a light source which indirectly illuminates the spatial light modulation element through the polarization element and the integrator;
    a projection lens for projecting an image produced by the spatial light modulation element; and
    a reflection plane surface disposed in the vicinity of the rear end portion of the projection lens in such a manner to minimize a tilt angle between a surface of the spatial light modulation element and an optical axis of the illumination light beams incident on the spatial light modulation element, and in such a manner that any modulated light beam reflected from the spatial light modulation element does not cross the illumination beam that generated it, and
    wherein the aspect ratio of respective elements of the integrator is reduced in a direction in which the optical axis of the illumination light is tilted with respect to the spatial light modulation element as compared to the aspect ratio of the illumination range of the spatial light modulation element, and wherein when the tilt angle formed between the optical axis of the illumination light emitted from the illumination optical system and the surface of the spatial light modulation element is θ, the aspect ratio in the direction of tilt of respective elements of the integrator is caused to be the aspect ratio in the direction of tilt of the illumination range of the spatial light modulation element multiplied by cos θ.

2. An image display apparatus comprising:

a spatial light modulation element including a reflection electrode;

an illumination optical system including a polarization element, an integrator in which plural elements are arranged in a matrix form, and a light source which indirectly illuminates the spatial light modulation element through the polarization element and the integrator;

a projection lens for projecting an image produced by the spatial light modulation element; and a reflection plane surface disposed in the vicinity of the rear end portion of the projection lens in such a manner to minimize a tilt angle between a surface of the spatial light modulation element and an optical axis of the illumination light beams incident on the spatial light modulation element, and in such a manner that any modulated light beam reflected from the spatial light modulation element does not cross the illumination beam that generated it, and wherein the aspect ratio of respective elements of the integrator is reduced in a direction in which the optical axis of the illumination light is tilted with respect to the spatial light modulation element as compared to the aspect ratio of the illumination range of the spatial light modulation element.

* * * * *